(12) United States Patent
Shraer et al.

(10) Patent No.: US 9,397,957 B2
(45) Date of Patent: Jul. 19, 2016

(54) TRAFFIC ENGINEERING FOR LARGE SCALE DATA CENTER NETWORKS

(71) Applicant: Google Inc., Mountain View, CA (US)

(72) Inventors: Alexander Shraer, San Francisco, CA (US); Junlan Zhou, Sunnyvale, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 219 days.

(21) Appl. No.: 14/139,150

(22) Filed: Dec. 23, 2013

(65) Prior Publication Data

US 2015/0180778 A1   Jun. 25, 2015

(51) Int. Cl.
*H04L 12/801* (2013.01)
*H04L 12/931* (2013.01)
*H04L 12/803* (2013.01)
*H04L 12/729* (2013.01)

(52) U.S. Cl.
CPC .............. *H04L 49/205* (2013.01); *H04L 47/10* (2013.01); *H04L 49/356* (2013.01); *H04L 45/125* (2013.01); *H04L 47/125* (2013.01)

(58) Field of Classification Search
CPC ...................................................... H04L 47/10
See application file for complete search history.

(56) References Cited

U.S. PATENT DOCUMENTS

| | | | | |
|---|---|---|---|---|
| 2008/0291924 A1* | 11/2008 | Ishii | ........................ | H04L 45/00 370/400 |
| 2012/0057466 A1* | 3/2012 | Allan | .................... | H04L 45/125 370/238 |
| 2014/0169169 A1* | 6/2014 | Almog | ................ | H04L 47/2441 370/235 |
| 2015/0109934 A1* | 4/2015 | Harshavardha | ....... | H04L 45/125 370/238 |
| 2015/0163148 A1* | 6/2015 | Harmatos | ............. | H04L 47/762 370/235 |

FOREIGN PATENT DOCUMENTS

WO   WO-2005/018175 A2   2/2005
WO   WO-2011/071850 A2   6/2011

OTHER PUBLICATIONS

Anderson, et al., xOMD: Extensible Open Middleboxes with Commodity Servers, Copyright 2012.
Chang, et al., "Birkoff-von Neumann Input Buffered Crossbar Switches", IEEE Infocom, pp. 1614-1623, 2000.

(Continued)

*Primary Examiner* — John Blanton
(74) *Attorney, Agent, or Firm* — Edward A. Gordon; John D. Lanza; Foley & Lardner LLP (57) ABSTRACT

The present disclosure provides for the determination of bandwidth allocation of inter-block traffic in a data center network. It employs a number of optimization objectives and a heuristic water-filling strategy to avoid producing unnecessary paths and to avoid determining paths that would be unavailable when actually needed. Allocation may be adjusted incrementally upon node and link failure, for instance to perform only the minimal allocation changes necessary. If demand between a source and a destination cannot be satisfied, a decomposition process may be used to allocate remaining demand. One aspect constructs a graph for route computation based on inter-block topology. Here, the graph initially starts with a highest level of abstraction with each node representing a middle block, and gradually reduces the abstraction level to identify paths of mixed abstraction level to satisfy additional demand.

20 Claims, 9 Drawing Sheets

(56) References Cited

OTHER PUBLICATIONS

Floyd, "Link-Sharing and Resource Management Models for Packet Networks", IEEE/ACM Transactions on Networking, vol. 3, No. 4, pp. 365-386, Aug. 1995.

Massoulié, et al., "Bandwidth Sharing: Objectives and Algorithms", IEEE/ACM Transactions on Networking, vol. 10, No. 3, pp. 320-328, Jun. 2002.

McKeown, et al., "OpenFlow: Enabling Innovation in Campus Networks", Mar. 14, 2008.

OpenFlow Switch Specification, pp. 1-56, Feb. 28, 2011.

Porter, et al., "Integrating Microsecond Circuit Switching into the Data Center", pp. 447-458, Copyright 2013.

Radhakrishnan, et al., "Dahu: Commodity Switched for Direct Connect Data Center Networks", pp. 59-70, Copyright 2013.

Radhakrishnan, et al., "NetShare and Stochastic NetShare: Predictable Bandwidth Allocation for Data Centers", ACM Sigcomm Computer Communication Review, vol. 42, No. 3, pp. 5-11, Jul. 2012.

Yuan, et al., "Fair Round-Robin: A Low-Complexity Packet Scheduler with Proportional and Worst-Case Fairness", IEEE Transactions on Computers, vol. 58, No. 3, pp. 365-379, Mar. 2009.

Yuan, et al., "FRR: a Proportional and Worst-Case Fair Round Robin Scheduler", pp. 831-842, Copyright 2005.

Zhang, et al., "Adaptive Max-min Fair Scheduling in Buffered Crossbar Swices Without Speedup", pp. 454-462, Copyright 2007.

International Search Report and Written Opinion mailed Aug. 25, 2015 in PCT Application No. PCT/US2014/071857.

Jaseemuddin, et al. TE-Friendly Content Delivery Request Routing in a CDN, IEEE International Conference on Communications, pp. 323-330, Jun. 1, 2006.

\* cited by examiner

FIG. 7B

TRAFFIC ENGINEERING FOR LARGE SCALE DATA CENTER NETWORKS

BACKGROUND

In computer data centers, many different hosts are used to process, store and transfer large amounts of data. Each host may include one or more processors, memories and interfaces. The hosts, such as servers, are often arranged within racks, with multiple servers housed per rack. Each rack may have a top-of-rack ("TOR") switch for communication with a next switching layer. This switching layer may include a cluster of switches ("middle blocks") that provides bisectional high volume localized traffic. In turn, multiple middle blocks may be logically grouped into larger clusters ("fabric blocks"). This creates a multi-level switching arrangement.

Fabric blocks can be located across the data center, with their highest stage of switches interconnected using expensive long-range fibers and optics. The interconnections among fabric blocks often employ a direct connection instead of using a CLOS-type topology as a tradeoff between bisectional bandwidth and lower cost. However, it is challenging to provide a system with fair bandwidth allocation that also respects different classes of service, and that efficiently works across the multi-level switching environment. This can be especially challenging as the number of hosts and the overall size of the data center increase.

BRIEF SUMMARY

One aspect of the present disclosure determines bandwidth allocation of inter-block traffic in a data center network across a set of end-to-end paths based on a variety of information. It employs a number of optimization objectives and a heuristic water-filling strategy to avoid producing unnecessary paths and to avoid determining paths that would be unavailable when actually needed.

According to one aspect of the disclosure, a method of traffic engineering in a computer network is provided. the computer network has a plurality of fabric blocks in communication with one another, and one or more middle blocks in each fabric block. The method comprises identifying, by one or more processors, a source fabric block $FB_s$ from among the plurality of fabric blocks; evaluating, in round-robin order, each destination fabric block of the plurality of fabric blocks; choosing in round-robin order, by the one or more processors, a single destination middle block $MB_d$ in a selected destination fabric block $FB_d$; selecting in round-robin order, by the one or more processors, a source fabric block $FB_s$; identifying, by the one or more processors, a subset M of source middle blocks from among all middle blocks in the source fabric block $FB_s$, the subset of middle blocks being identified as having a shortest available path length to the destination middle block $MB_d$; and selecting for use in a network path, by the one or more processors, one of the source middle blocks $MB_s$ in the subset M that maximizes the following condition:

$$\min(\text{demand}(MB_s, FB_d), \text{spf\_capacity}(MB_s, MB_d)),$$

in which $\text{spf\_capacity}(MB_s, MB_d)$ represents a shortest path capacity between the source middle block $MB_s$ and the destination middle block $MB_d$, and $\text{demand}(MB_s, FB_d)$ represents a demand between the source middle block $MB_s$ and the destination fabric block $FB_d$.

In one alternative, the method further comprises generating a route computation graph that facilitates bandwidth allocation through iterative selection of source and destination middle blocks maximizing the condition. In another alternative, the method further comprises, for each source fabric block, splitting demand to a destination fabric block equally among each non-faulty middle block in the destination fabric block.

The method may further comprise scaling out each middle block as a single node; determining all middle block-level paths for each middle block; and setting up a tunnel table for each middle block-level path. In yet another example, if not all of the demand is satisfied, the method further comprises identifying any residue inter-block bandwidth.

In another alternative, the method is iteratively performed for multiple priority groups. This may include iteratively performing the method for each class of service within each of the multiple priority groups. In this case, the method may further comprise applying a weighting to each class of service within the multiple priority groups.

In a further alternative, the method further comprises updating the selection of the source middle block $MB_s$ based on at least one of an up link event and a down link event.

The above method may be performed by one or more processors as set forth below. A recording medium storing instructions for performing the method is also provided.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The technology described herein presents a traffic engineering solution for data center networks, including networks employing direct connect topologies. As noted above, large scale data center networks may include multiple stages of switches that incorporate tradeoffs between cost and bandwidth. One aspect of the technology employs a fairness function that has multiple optimization goals and uses different allocation strategies to provide efficient data routing.

Many network allocation algorithms consider fairness and classes of service. However, in a network of super-switches, it is possible to leverage the switching abstraction instead of considering a graph composed of low-level physical switching elements. This approach creates a much smaller graph, which translates into allocation speedup. In addition, while bandwidth allocation solutions may consider simple notions of fairness, such as max-min fairness across different flows in the network, as discussed herein the grouping of switches creates new fairness requirements, such as fairness across traffic going through the different middle blocks of a super-block. Additional constraints stem from limited number of tunnel entries in switches.

According to certain aspects discussed in detail below, a fairness function comprises multiple optimization goals. Such goals may be considered in decreased importance, and include:
1. Preserving classes of service,
2. Max-min fairness,
3. Intra-superblock max-min fairness,
4. Minimize path distance,
5. Minimize the total number of paths, and
6. Minimize the number of paths required to satisfy a given demand.

With regard to the first goal, classes of service may be grouped into priority groups. Strict priority is enforced across different priority groups, and weighted fairness within each priority group. The partition of classes of service into priority groups and the weights of different classes of service are given as inputs to the overall process.

Aspects of the technology involve constructing a graph from middle blocks, and only when no more demands can be satisfied decompose chosen middle locks into switching chips, which creates a graph of switches of different abstraction levels. Unlike solutions that always produce k-disjoint shortest paths between a source and a destination, paths are determined on demand. There are two main advantages to such an approach. First, unnecessary paths are not produced. Second, paths that will be unavailable when actually needed are not computed. For example, if the process computes 10 paths in advance from a first source (src1) to a first destination (dst1), these paths may share links with those from a second source (src2) to a second destination (dst2), and thus if one were to insist on using them fully to allocate demand from src1 to dst1, it may violate fairness. Instead, according to one aspect, an iterative approach is employed.

By way of example, initially all (not necessarily disjoint) paths of minimal length between every pair of nodes are computed where some demand is to be allocated (unlike the k-shortest paths described above, only paths of minimal length are computed, thus all paths produced at this step have equal length). The process then uses a multi-stage water filling procedure that satisfies the optimization goals. Only when all paths of minimal length are exhausted from a source to a destination are the next-minimal paths computed between them with available capacity.

The process is configured to incrementally adjust allocation upon node and link failure, only performing the minimal allocation changes needed. If demand between source and destination cannot be satisfied, a decomposition technique is used to replace a middle block with switching chips in the network graph, and then the process attempts to allocate the remaining demand.

This is advantageous in that it provides a robust optimization function that captures real production needs, such as balancing traffic, minimizing chip table entries and more. Iterative decomposition of the graph leverages abstraction of switching elements used in super clusters. The techniques employed adjust to demand changes, failures, and take into account quality of service parameters.

Figure 1:
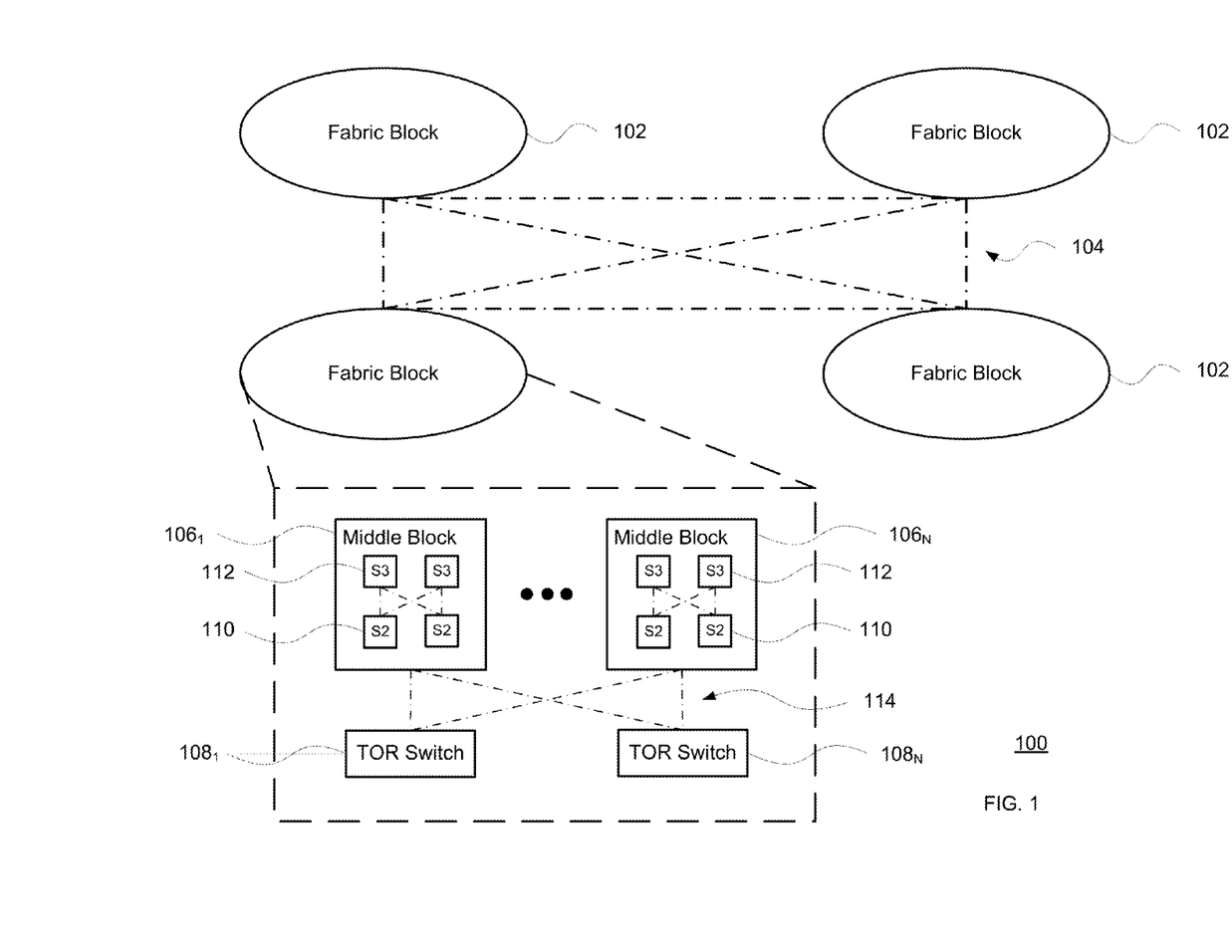
FIG. 1 illustrates an example multi-stage data center network for use with aspects of the disclosure.

FIG. 1 illustrates an example multi-stage data center network 100. The network 100 includes multiple fabric blocs 102, which are shown being directly connected via links 104 represented by dotted and dashed lines. In practice, the links 104 may be optical fiber links. In this example, each fabric block 102 includes a 2-stage network comprising multiple middle blocks 1061 to 106N interconnecting multiple top-of-rack switches 1081 to 108M.

Each middle block 106 may include two stages of switches, namely a first stage 110 (S2) and a second stage 112 (S3). Each middle block's 2-stage network of S2 and S3 switches may be interconnected in a Clos arrangement. Similar to the connections between fabric blocks 102, the middle blocks 106 and TOR switches 108 are directly connected via links 114, which may also be optical fiber links.

Figure 2:
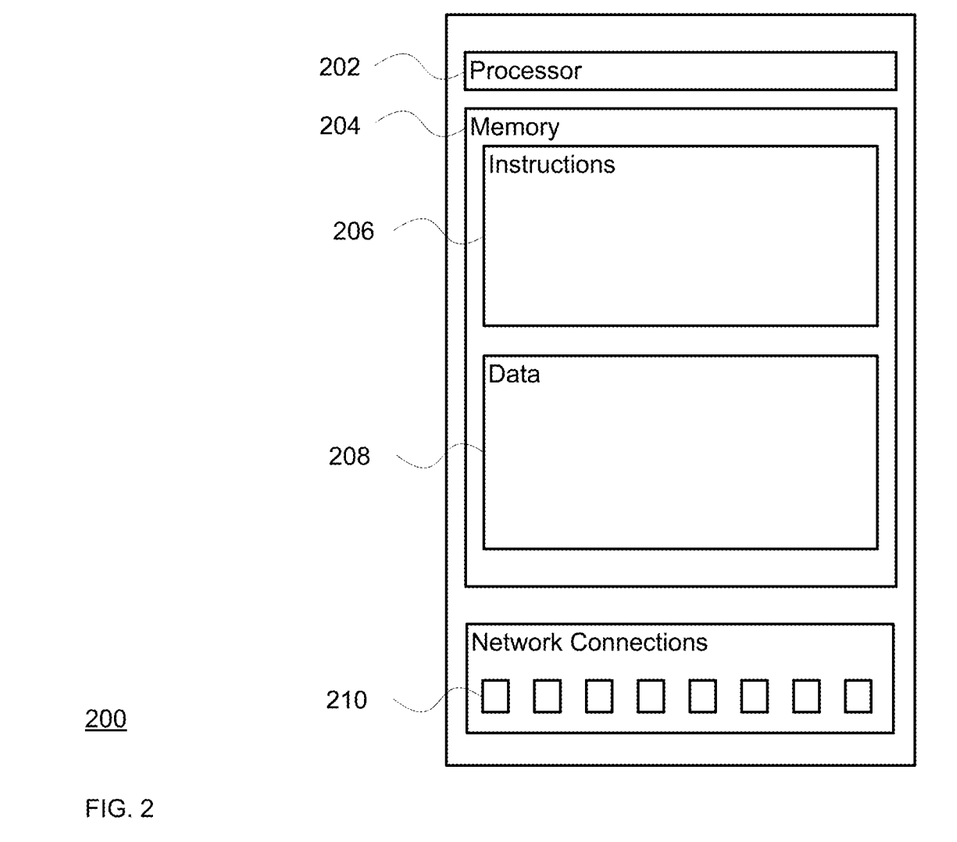
FIG. 2 illustrates an example host computing device for use with aspects of the disclosure.

As shown in FIG. 2, each switch 200 may include one or more processors 202, e.g., a CPU and/or an ASIC. The switches 200 also include memory 204 that stores instructions 206 and data 208. Multiple connections via ports 210 provide communications links between other switches in the data center network.

Traffic engineering for such multi-stage data center networks should address different challenges that are not encountered in traditional ISP networks. For instance, traffic engineering should scale well to efficiently compute routes for data center networks several orders of magnitude larger than a traditional ISP network, and should also minimize route convergence time upon failure. It should also address topology heterogeneity in the data center networks and reduce congestions of traffic flows end-to-end on both intra and inter-block links. Furthermore, traffic engineering should also account for limited forwarding table entries in network switches.

In order to address such challenges, aspects of the traffic engineering solution use a variety of information as inputs in order to determine bandwidth allocation of inter-block traffic across a set of end-to-end paths. The input information takes into account some or all of: inter-block topology, a set of traffic demands that describe a desired aggregate throughput between a pair of source and destination fabric blocks for a given class of service ("CoS"), scheduling policy (e.g., priority groupings) among different CoS, and the capacity of middle blocks to serve transit inter-block traffic.

To achieve this, a number of optimization objectives are taken into account. One objective is fairness among traffic demands between different source and destination fabric blocks. Another is to minimize the hop count of inter-block traffic to reduce latency. Yet another objective is to minimize the path count of inter-block traffic to reduce the number of forwarding table entries. A further objective is to minimize congestions on inter- and intra-block links. Another objective is to minimize the run-time speed of the traffic engineering process. A further objective is to minimize the route convergence time should a failure occur. And another objective is to account for quality of service. These objectives are achieved as discussed in detail below.

One aspect of bandwidth allocation discussed herein incorporates a "water-filling" technique to increase the bandwidth allocation for traffic demands of different source and destination fabric block pairs at the same pace. Bandwidth allocations freeze for traffic demands that are fully satisfied, and continue to increase for those that remain unsatisfied. This is done, in one instance, by favoring the shortest path first to reduce hop count, and thus the latency of inter-block traffic.

Figure 3:
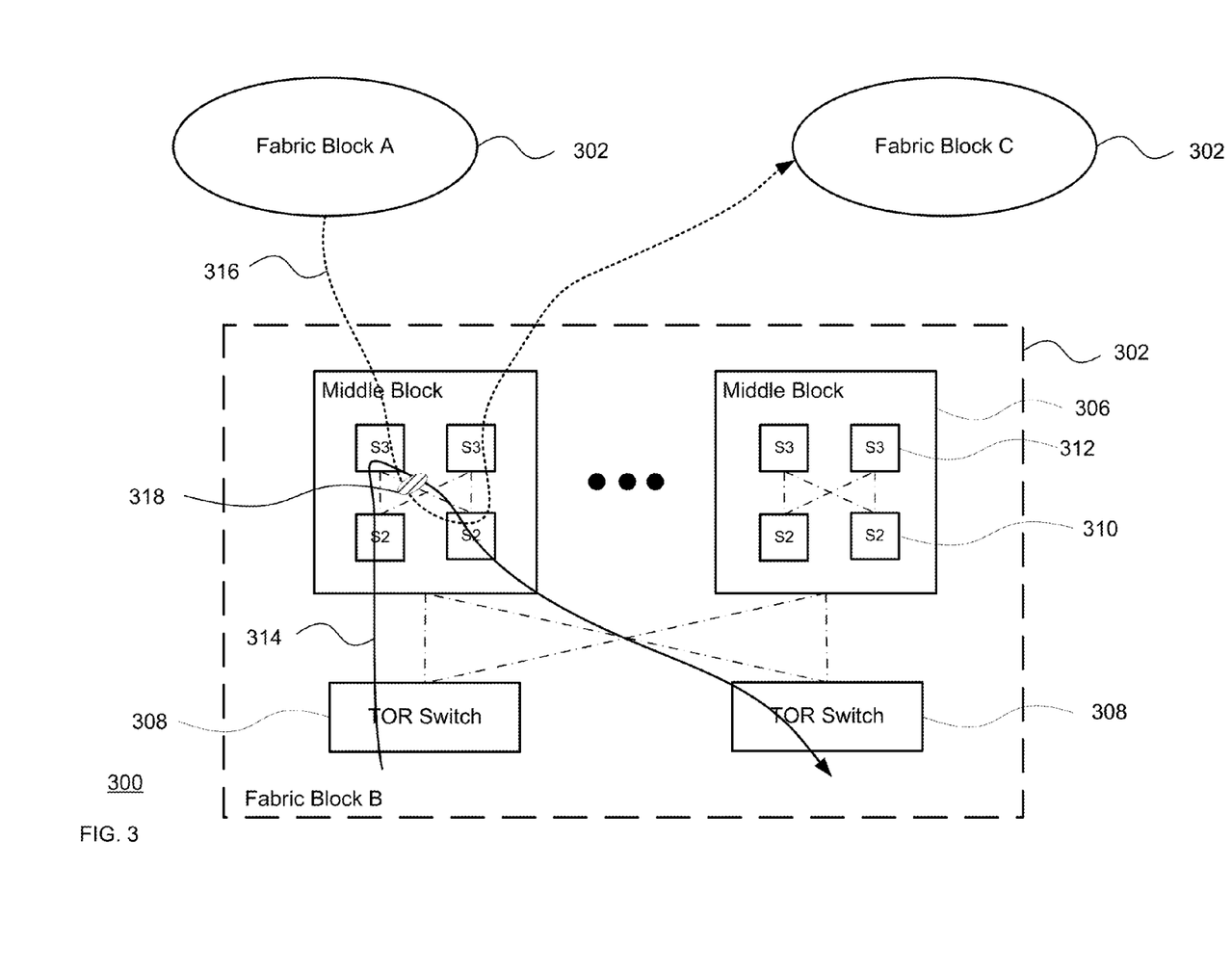
FIG. 3 illustrates an example of congestion in an intra-middle block edge.
Figure 4:
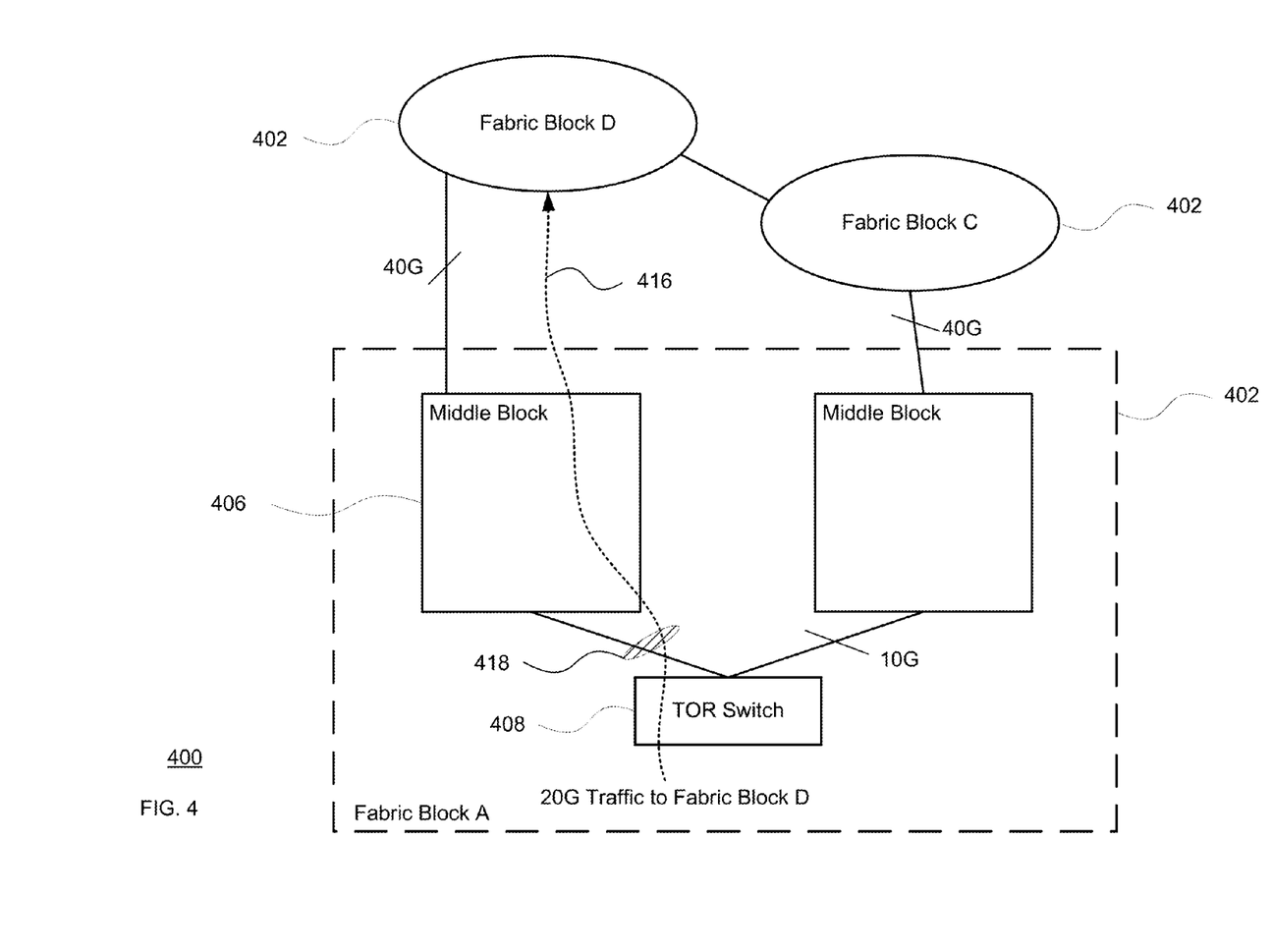
FIG. 4 illustrates an example of congestion on a top-of-rack uplink.

As shown with regard to FIGS. 3 and 4, while switches within each fabric block are interconnected in a Clos topology, congestion may still occur. FIG. 3 illustrates an example network 300 with three fabric blocks 302 that are connected by, e.g., optical interconnects (not shown). The middle blocks 306 and TOR switches 308 of fabric block B are interconnected, and the S2 switches 310 and S3 switches of each middle block 306 are also interconnected, as discussed above with regard to FIG. 1.

In this example, each middle block 306 is a Clos network, which may comprise only two stages for cost reduction purposes. Intra-block traffic 314 and inter-block traffic 316 are shown by solid and dotted lines, respectively. Congestion 318 may occur if such a middle block in fabric block B serves both intra-block traffic and transit inter-block traffic from fabric block A destined for fabric block C.

FIG. 4 illustrates an example scenario 400 with a native bandwidth allocation scheme to maximize the utilization of a shortest path between fabric blocks A and D. Here, inter-block communication between the fabric blocks 402 occurs at 40 Gigabits/sec (40 G), while intra-block communication occurs at a rate of 10 Gigabits/sec (10 G). If inter-block traffic from TOR switch 408 through middle block 406 to fabric block D has a maximum rate of 20 Gigabits/sec (20 G), this will result in congestion 418 on the uplink when bursting at rate.

To minimize congestion on inter-middle block edges, one aspect of the traffic engineering process determines the capacity of a path as the minimum between (a) the capacity of a bottleneck inter-block link and (b) the capacity of the bottleneck middle block for serving transit inter-block traffic without any congestion. Each middle block edge connection may comprise one or more physical communication links.

Figure 4A:
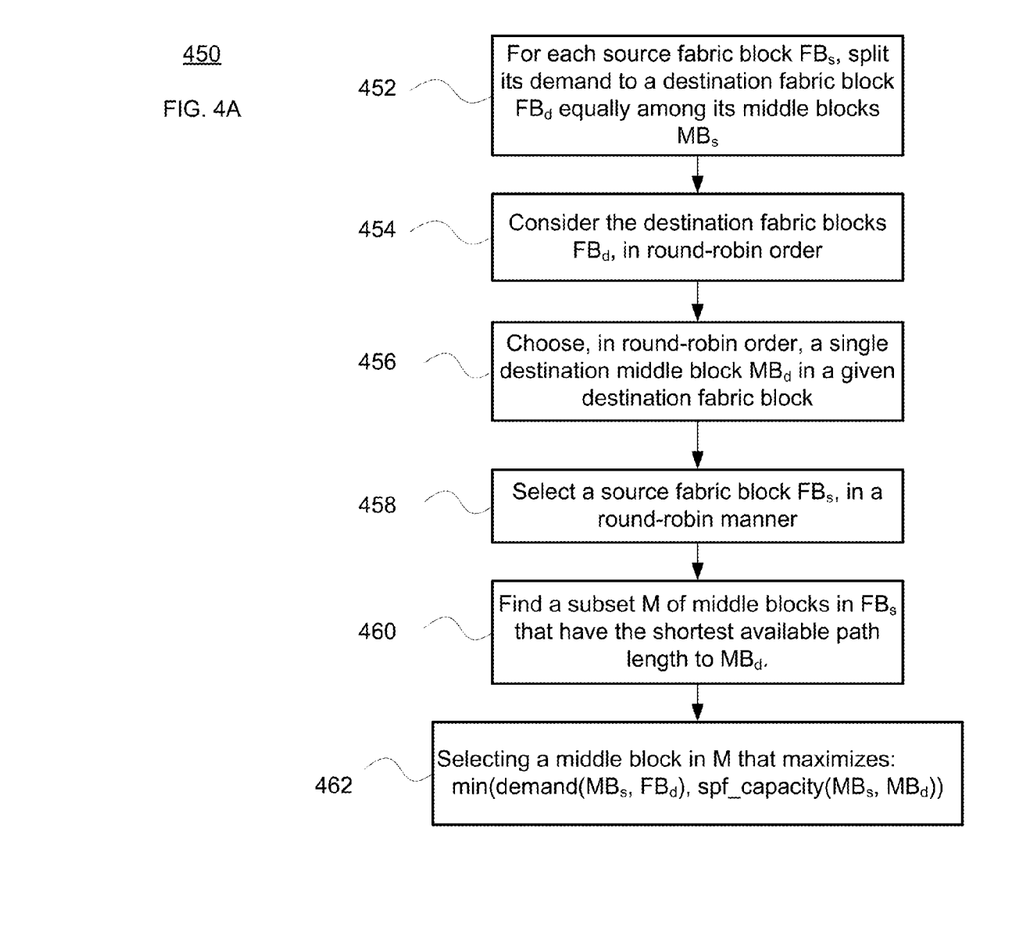
FIG. 4A illustrates a flow diagram of a traffic engineering process in accordance with aspects of the disclosure.

To minimize congestion on TOR uplinks, the traffic engineering process uses the strategies discussed below to ensure inter- and intra-block "max min" fairness. A flow diagram 450 illustrating this process is shown in FIG. 4A.

Firstly, for each fabric block, the process splits a bandwidth demand to a destination fabric block equally among the middle blocks of that fabric block, as shown in block 452. Secondly, the process uses the following heuristic water filling strategy to increase bandwidth allocations to different source/destination fabric blocks at the same pace, and additionally to allocate inter-block path bandwidth to different middle blocks in a source or destination fabric block evenly in a round robin manner as follows.

Consider destination fabric blocks $FB_d$, in round robin, as shown in block 454. Each time a fabric block $FB_d$ is considered, focus on a single destination middle block, $MB_d$, in $FB_d$, chosen in round robin, as shown in block 456. Select a source fabric block $FB_s$ in a round robin manner, as shown in block 458.

Among the middle blocks in source fabric block $FB_s$, find a subset M with the shortest available path length to destination middle block $MB_d$, as shown in block 460. Here, among the middle blocks in the subset M, as shown in block 462, choose a middle blocks that maximizes:

$$\min(\text{demand}(MB_s, FB_d), \text{spf\_capacity}(MB_s, MB_d)),$$

in which $\text{spf\_capacity}(MB_s, MB_d)$ represents the shortest path capacity between source middle block $MB_s$ and destination middle block $MB_d$, and $\text{demand}(MB_s, FB_d)$ represents the demand between source middle block $MB_s$ to destination fabric block $FB_d$.

In this scenario, for scalability and minimizing path count, the traffic engineering process first scales out each middle block as a single node and computes all middle block-level paths. The process terminates if all demand can be satisfied by such paths, and sets up a "tunnel" for each middle block-level path illustrated in FIGS. 5 and 6.

Figure 5:
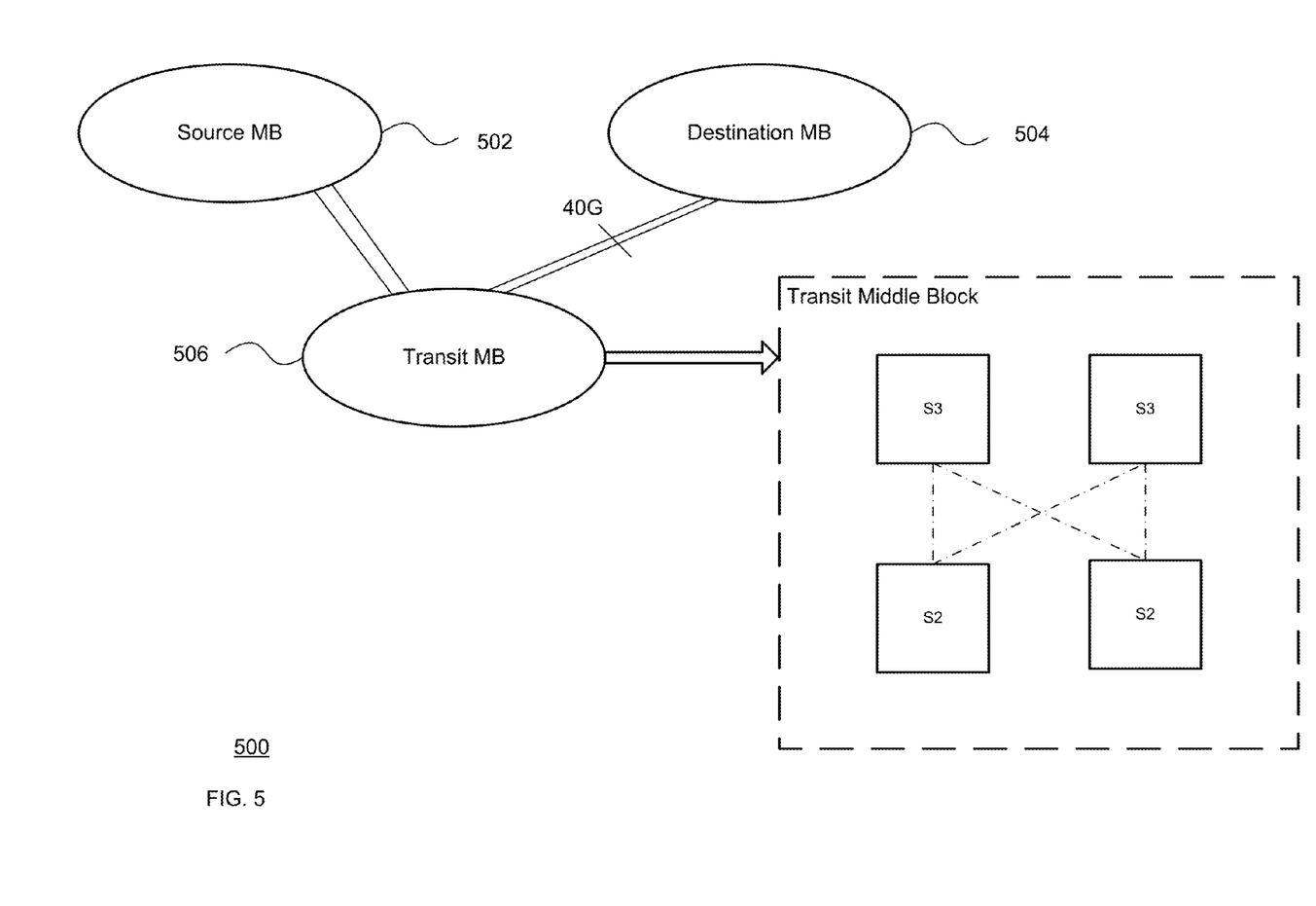
FIG. 5 illustrates an example route computation graph in accordance with aspects of the disclosure.
Figure 6:
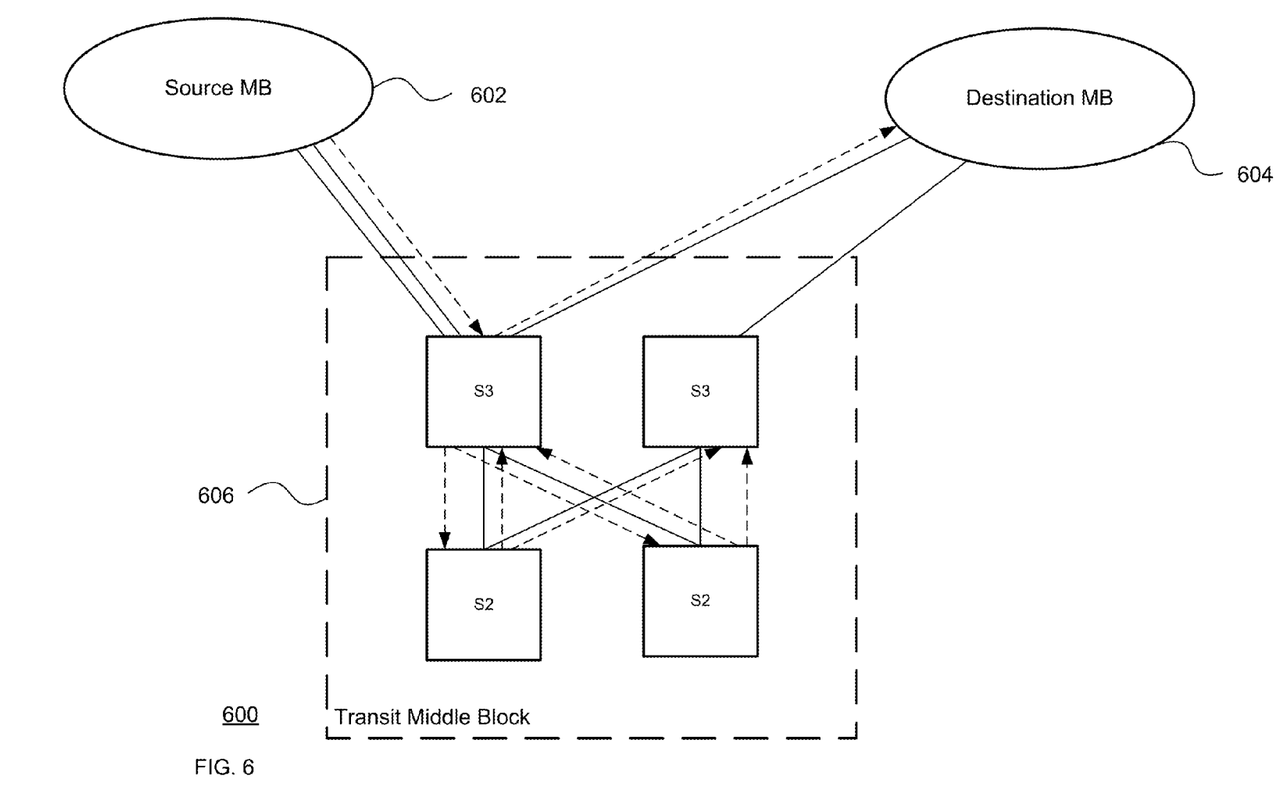
FIG. 6 illustrates an example middle block path between source and destination middle blocks in accordance with aspects of the disclosure.

FIG. 5 illustrates an arrangement 500 with a source middle block 502, a destination middle block 504 and a transit middle block 506. The middle blocks may each have 2-stage network of S2 and S3 switches interconnected in a Clos arrangement as discussed above. And the example 600 of FIG. 6 illustrates an example middle block-level path between source middle block 602 and destination middle block 604 via the 2-stage switch network of transit middle block 606. Here, the dashed lines indicate edges between different switches. This arrangement leads to minimal execution time of the traffic engineering process, and helps minimizing the tunnel table entries to be programmed on switches typically with only hundreds of tunnels.

Figure 7A:
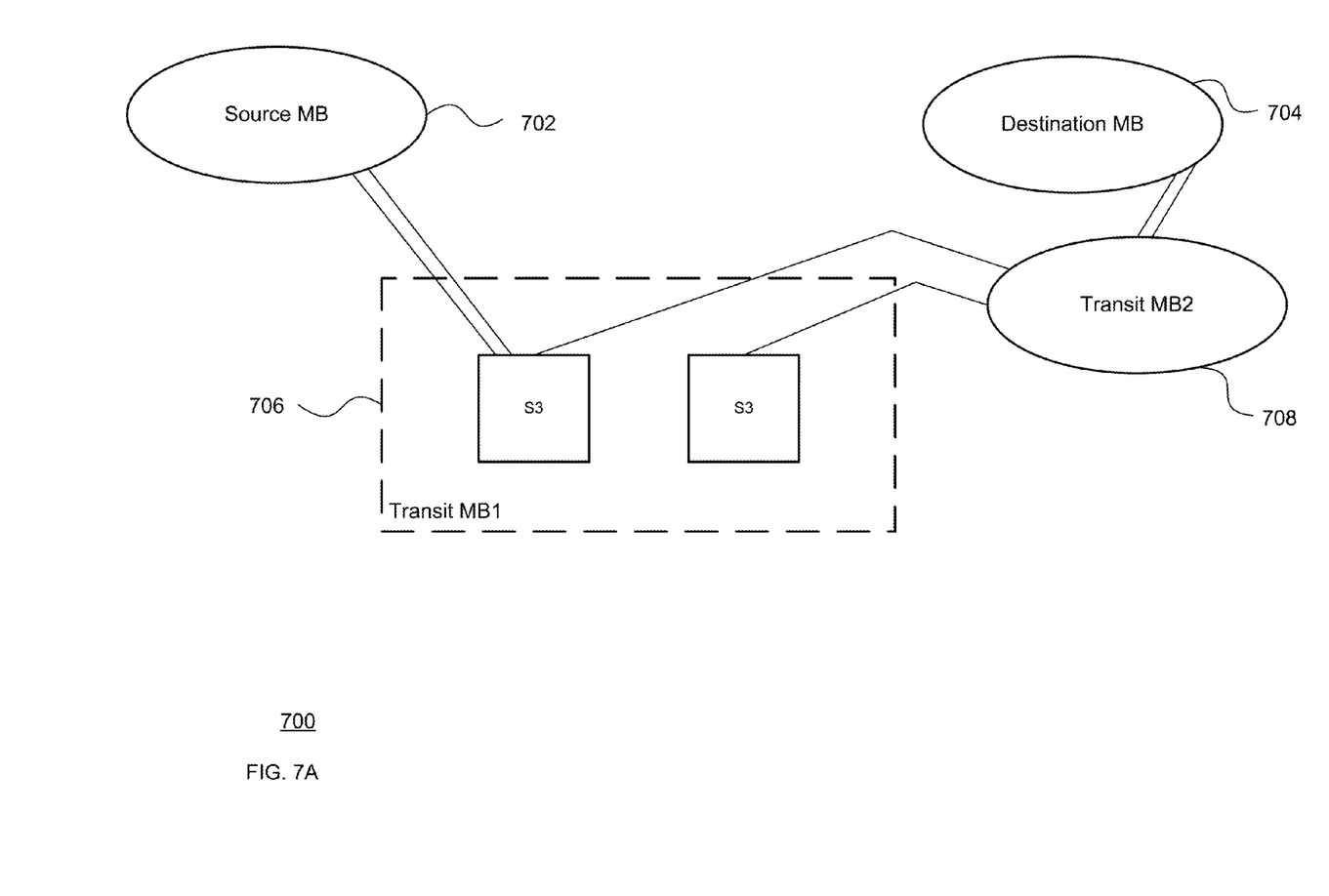
FIG. 7A illustrates another example route com graph in accordance with aspects of the disclosure.
Figure 7B:
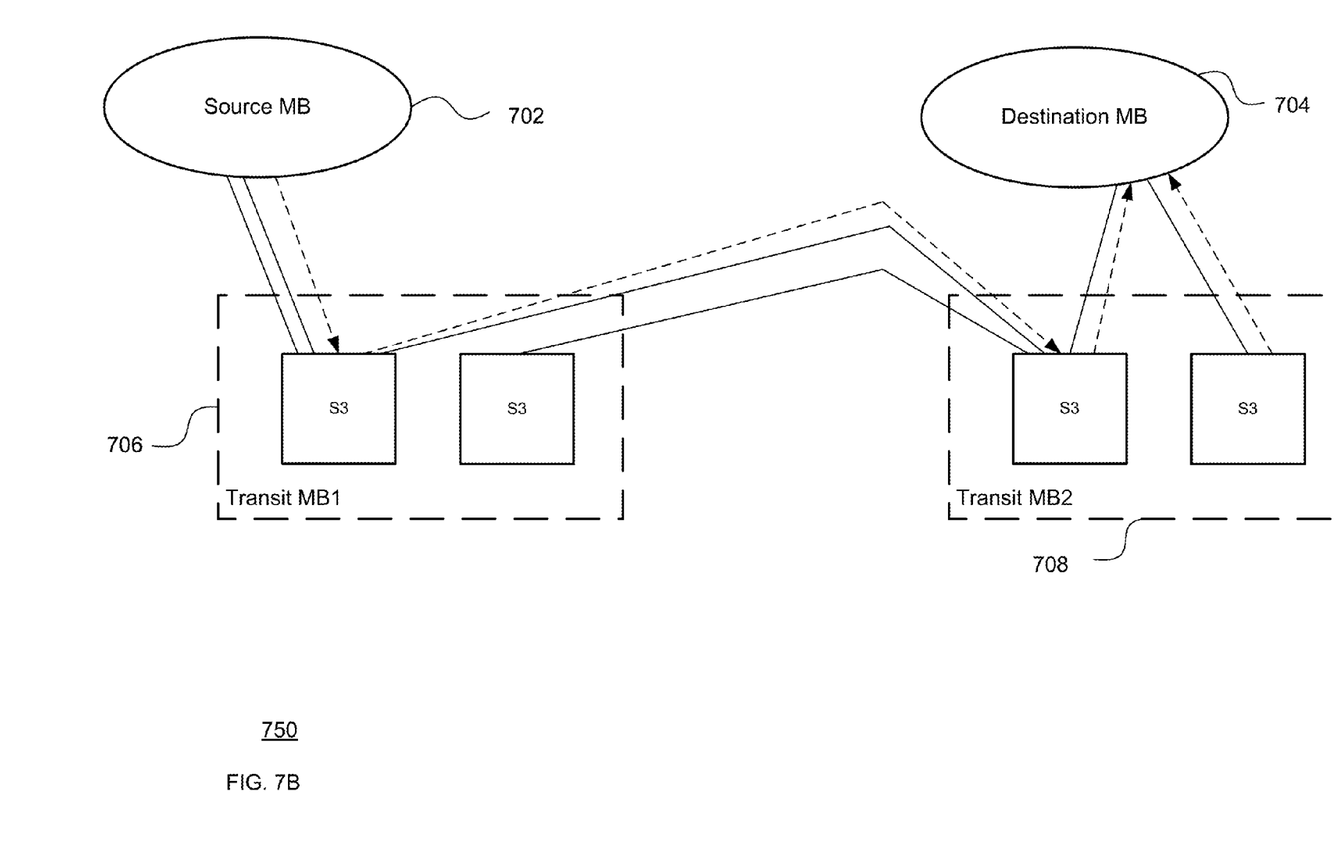
FIG. 7B illustrates an example inter-block path with a mixed abstraction level in accordance with aspects of the disclosure.

If not all demand is satisfied, the TE process continues to identify residue inter-block bandwidth not requiring bouncing within middle blocks. According to one aspect of the disclosure, an approach constructs graphs with decreasing abstraction levels, which is iteratively shown in FIGS. 7A-B. FIG. 7A illustrates a route computation graph 700 having a source middle block 702, a destination middle block 704, and two transit middle blocks 706 and 708. As shown here, transit middle block 706 (MB1) is already decomposed into S3 chips. Illustration 750 of FIG. 7B shows a graph of decomposition of the transit middle block MB2 into S3 switches with corresponding edges between the different middle blocks indicated by the dashed lines.

In such graphs, middle blocks with 0 residue capacity are decomposed into a set of disconnected s3 switches. The traffic engineering process determines new inter-block paths that transit a set of middle blocks with nonzero residue capacity and s3 switches in middle blocks without residue capacity. This repeats until the graph includes only s3 switches in middle blocks, or no demand can be satisfied.

One benefit of starting with a graph derived from middle blocks and decomposing into switches only if no more demand can be satisfied stems from the observation that there are many more switch-level paths than middle block-level paths with likely much higher aggregate capacity. This is illustrated in details below.

For example, assuming each middle block (MB) of a fabric block (FB) comprises eight S2 and eight S3 switches. A single hop middle block-level path between a first middle block MB1 and a second middle block MB2 would translate into 3-hop switch level paths: MB1.s2 - - - MB1.s3 - - - MB2.s3 - - - MB2.s2.

In this case, because each middle block has eight S2 level switches, any of those s2 switches can be used to traverse this path in both the source and destination middle blocks. Hence, there are in total 64 different switch level paths, each identified by a unique combination of MB1.s2 and MB2.s2. For instance, two different switch level paths could be:

MB1.s2[0] - - - MB1.s3[2] - - - MB2.s3[4] - - - MB2.s2[0]
MB1.s2[0] - - - MB1.s3[1] - - - MB2.s3[3] - - - MB2.s2[1]

Here, the numbers in brackets identify which specific s2 and s3 chips the path traverses.

It is possible for two middle blocks to be connected by multiple S3 links. In such a case, the total number of paths in the one hop case is the number of links between the S3 switches of first middle block MB1 and the S3 switches of second middle block MB2 multiplied by 64. For a path of length k, even if there is only one S3 link connecting each pair of MB on the path, the number of switch level paths is $8^{(k+1)}$. Thus, abstracting away switches and looking initially on middle block level paths considerably reduces the graph and hence speeds up the route computation process.

To minimize route convergence upon topology events, one aspect of the traffic engineering process identifies demand affected by the failure events, or residue demand not satisfied prior to link/switch up events, and determines a minimum set of new paths to be allocated for such demands. This incremental updating is performed instead of rerunning the path bandwidth allocation algorithm entirely from scratch.

Different classes of service (CoS) are supported by the traffic engineering process. The process handles a set of demands, each of which may be represented as a triple (CoS, source MB, destination fabric block). The classes of service are grouped into priority groups. For example, if there are four classes of service (CoS1, CoS2, CoS3 and CoS4), a possible configuration may instruct grouping CoS1 and CoS2 together in a first priority group 1 and CoS3 and CoS4 together in a second priority group 2. The arrangement of different classes of service into priority groups serve as an input into the process.

The process desirably applies strict priority between different priority groups with weighted fair allocation within a priority group. Thus, the process first tries to satisfy all demands in priority group 1, and only then moves to priority group 2. When allocating bandwidth for group 1, "weighted water-filling" is performed, in which the weights are given as an input to the process. Essentially, instead of trying each time to decrease demand by some amount (delta), it is decreased by that amount while taking into account a weighting of the class of service according to delta*weight(CoS). Thus, the process flow described above with regard to FIG. 4A may be repeated for multiple priority groups, and also for each CoS within a priority group.

A high level pseudo code example of a traffic engineering process ("GraphConstruction") in accordance with aspects of the technology is presented below. The GraphConstruction( ) function constructs a graph for route computation based on inter-block topology. Initially, the graph starts with a highest level of abstraction with each node representing a middle block, and gradually reduces the abstraction level to identify paths of mixed abstraction level to satisfy additional demand. The rest of the pseudo code implements the allocation strategies described above.

```
Repeat GraphConstruction( ) :
// Each graph includes a set of nodes, which could be a middle
// block with >0 residue capacity or a top-stage s3 switch in
// a middle block with 0 residue capacity
    For each priority_group // descending priority order
        while priority_group.demand:
            For each CoS in the priority_group // round robin order
                // Serve up to CoS.weight demand
                While allocated < CoS.weight
                    // water-filling among traffic to destination
                    // fabric blocks (Dst_FBs)
                    For each Dst_FB: // round robin among all dst FBs
                        // round robin among destination MBs in Dst_FB
                        Dst_FB.MB_d = 1 + Dst_FB.last_mb
                        // round robin among all source FBs
                        Src_FB = 1 + Dst_FB.MB_d.Src_FB_last
                        // select candidate source MBs in Src_FB with
                        // shortest path capacities to Dst_FB.MB_d
                        Src_MB_list = SelectSrcMBs(Src_FB, Dst_FB.MB_d)
                        // select the source MB maximizing min(demand(CoS,
                        // MB_s, Dst_FB.MB_d),spf_cap(MBs, Dst_FB.MB_d))
                        Src_FB.MB_s = SelectBestSrcMB(CoS, Src_MB_list,
                            Dst_FB.MBd)
```

-continued

```
                        AllocateDemand(alloc_unit, Src _FB.MB_s, Dst_FB.MB_d)
                        allocated += alloc_unit;
// Repeat GraphConstruction( ) until no demand can be satisfied
```

The traffic engineering process desirably uses some or all of the below building blocks for path determination and bandwidth allocations.

(I) Shortest Paths Calculation

It is possible to implement a variation of the Dijkstra single source shortest path algorithm to calculate shortest paths. In the variation for use with aspects of the technology discussed herein, the input is a source MB (src) and the residual middle block graph. The algorithm finds all shortest paths from src to each of the other nodes. For each node in the graph it produces a list of predecessors that correspond to all shortest paths from src to that node.

An edge is considered viable as long as its residual capacity is greater than 0 and the residual capacity of its endpoint nodes is greater than 0. The algorithm is run in parallel from a given list of source nodes. Initially, this list includes all nodes in the graph. When all shortest paths between some source and destination nodes are exhausted, the shortest paths search is invoked with the list containing only the relevant source node (see below).

(II) Find Maximum Capacity Shortest Path

A recursive function may be employed to find the maximum capacity shortest path from a given source node (src) to a given destination node (dst). In addition to src and dst, the recursive function takes as input the list of dst's predecessors that correspond to shortest paths from src to dst. The function goes over the predecessors one by one, and calculates the capacity of the last hop according to a minimization function:

last_hop_capacity=min(predecessor mb capacity,dst mb capacity,edge capacity between predecessor and dst).

If last_hop_capacity is smaller than the maximal path capacity seen so far, there is no reason to consider this predecessor further. Otherwise, the function is invoked recursively with this predecessor, and the overall path capacity using this predecessor is the min(last_hop_capacity, max capacity path from src to predecessor). If that path capacity is bigger than the maximum found so far, the maximum is updated. The recursion uses a cache in order to avoid recalculating max capacity paths that were already found.

(III) Get Next Usable Shortest Path Between Two Middle Blocks

This method ("get_path") gets a source node ($MB_s$) and destination node ($MB_d$) as parameters, and finds a shortest path with nonempty capacity between these nodes. It escalates its search for the path according to the following three steps. First, if the last path used to allocate bandwidth between the source and destination still has some capacity, use that path. To this end, the system always remembers (e.g., stores in cache) the last path used for allocation between every pair of nodes. Second, the process finds the max capacity shortest path among the shortest paths found by the most recent invocation of the shortest paths calculation algorithm. If the returned path has nonempty capacity, use that path. And third, invoke the shortest paths calculation algorithm to look for new shortest paths, but this time only from the source to all other nodes in the graph. Then find the max capacity shortest path among the shortest paths found. Here, if the returned path has nonempty capacity, use that path.

(IV) Allocate Bandwidth on Path

This method ("allocate_path") gets a path and the demand as a parameter, and allocates min(path capacity, demand) on that path. The residual capacity is maintained for every link as well as every node (middle block).

(V) Inverted Index of Paths

This method ("index_path") gets a path as parameter. For every node and link in the given path, the path identifier is added to the list of paths traversing through the node/link, creating a reverse index. This allows the system to efficiently react to link and node failures by only considering the relevant paths for reallocating. For example, if there are two paths $p_1=(a, b, c)$ and $p_2=(d, b, c, e)$, the system would have the following index for the links (and similarly an index for the nodes):

(a, b): $p_1$
(b, c): $p_1$, $p_2$
(d, b): $p_2$
(c, e): $p_2$

According to one aspect of the technology, a path is represented by a unique path ID. The unique path ID may be produced by hashing the sequence of node IDs in the path.

(VI) Bandwidth Allocation: Widest Path

For this process ("widest_path"), there are inputs of a source fabric block $FB_s$, a destination middle block MB, and a constant DELTA indicative of capacity. The goal is to find the "best" middle block in the source fabric block $FB_s$, allocating DELTA on the next usable path between that source middle block and a given middle block MB and indexing the used path. This process returns the "best" source middle block or null if no suitable source middle block found.

An assumption is that the edge capacity is a multiple of DELTA. This assumption means that a path having less than DELTA capacity necessarily has no residual capacity. Therefore, when get_path is invoked, the process searches for the shortest path between the two nodes that has at least DELTA residual capacity. If it doesn't find such a path, it is determined that there are no more usable paths of any length between the source and destination.

In this process, the "best" source middle block in $FB_s$ is one that (in this order):

a) has at least DELTA capacity on the next usable path to MB and at least DELTA unsatisfied demand to the super block enclosing MB;
b) has minimal distance to MB; and
c) has maximal unsatisfied demand to the fabric block enclosing MB.

The process chooses one of such "best" middle blocks arbitrarily and allocates DELTA on the next shortest usable path between the middle block and the given middle block MB. The allocation itself is a mapping from source and destination middle block pairs to a list, where each element represents a different path, and comprises the path unique ID and the allocated amount on that path.

(VII) Bandwidth Allocation: Evaluate Possible Destinations

In this process ("allocate_bandwidth"), the input is a demand from a middle block to a fabric block, and the output is an allocation between the nodes in the graph associated with unsatisfied demand. The process rotates through possible destination fabric blocks. For each destination fabric block, the process maintains the current destination middle block, and rotates through the middle blocks in that destination fabric block each time the fabric block is considered for allocation. The system also stores a list of "burned target middle blocks." These are destination middle blocks for which the process has not been able to find a source, so there is no reason to consider them again in the future. The process terminates when all middle blocks in the graph are "burned."

Given a destination middle block, the process chooses a source fabric block in a round robin manner. It then invokes the widest_path bandwidth allocation process with that source fabric block and the destination middle block as parameters. If the widest_path bandwidth allocation process succeeds in making an allocation of DELTA, the allocate_bandwidth process returns to the start, this time considering a different destination middle block (in round robin). Otherwise, the allocate_bandwidth process chooses a different source fabric block, in round robin manner, and invokes the widest_path bandwidth allocation process from that fabrick block, and so on, until either the widest_path bandwidth allocation process succeeds in making an allocation or the allocate_bandwidth process has rotated through all possible source super blocks. In the latter case, the process "burns" the destination middle block.

As mentioned above, each "allocation" is a list of paths between some source and destination middle blocks, with each path having some allocated amount. The final step of the allocate_bandwidth process is to normalize these amounts, turning them into relative "weights", for instance using the following process.

An input to the process is a list of allocation amounts. Each amount corresponds to allocation on a different path between the same source and destination. The output is a list of relative weights, one per allocation amount. The process performs the following determination. Find the maximum allocation amount in the list, denoted as "max_allocation." For each allocation amount, create a weight (on the scale from 1 to 10), calculated as ceil(10*allocation/max_allocation). Here, "ceil" means ceiling, namely rounding up to the next bigger integer number. And then normalize the weights using their greatest common denominator ("GCD"). For example, 9:6:3 becomes 3:2:1.

(VIII) Deallocation Process

According to one aspect of the disclosure, when a physical link fails, the system may deallocate all the paths that traverse it. In a graph, a physical link is part of an edge between two middle blocks, so a failure of a physical link translates to reduced edge capacity. Thus, the right amount should be deallocated to meet that new capacity. Deallocation ("deallocate_paths_through_link") uses the reverse index of paths to find the paths which may be affected.

The input to this process is an edge between two middle blocks, and its new capacity. If the new capacity is enough to satisfy the current allocation through the link, the process is done. Otherwise, the process calculates the amount of bandwidth to deallocate. In one scenario, the process deallocates just enough bandwidth to meet the new capacity, so residual edge capacity after the deallocation is 0. Alternatively, it is possible to deallocate a little bit more than necessary so that the residual capacity is greater than 0. This would allow the system to tolerate some further failures without deallocating every time (over-reacting the first time but saving some time later).

All paths that traverse the affected communication link may be considered, sorted by descending allocation amount. The reason to do this is that the deallocation process should affect as few path as possible. For each path, the allocated amount is updated, or the path is completely removed from allocation if it is fully drained. The residual link and node capacities along the path are updated, along with the unsatisfied demand between source and destination nodes on the path, and the reverse path index. The process completes when deallocation meets the new capacity of the affected communication link.

(IX) Edge Capacities Update Process

The edge capacities update process ("capacities_update_delta") employs a list of pairs of the form (edge, capacity delta) as its input. The process evaluates the list. For each edge in the list, if the capacity is decreasing the process invokes deallocation (deallocate_paths_through_link) and then updates the link capacity. After the list has been processed, the system checks to see if there is any unsatisfied demand. If so, the allocate_bandwidth process is invoked to attempt incremental bandwidth allocation. Note that if a link capacity stays the same or increase, the process does not need to deallocate; however, the system can potentially satisfy some previously unsatisfied demand if deallocation is performed.

(X) Handling Node and Link Up/Down Events

Here, the list of events received through notification is treated as an input to the process. The output may be treated as true/false. The output is true if there are allocation changes, false otherwise. Here, the assumption is that the list of changes doesn't contain the same entity (link/node) twice. The order of processing events should not matter. The system maintains a map from an edge to the delta capacity of that edge. The system also maintains a set (P) of links for which it received a "link up" event or a node up event for one of its endpoint switches.

In the case of a "link down" event, the system marks the link state as down and remembers that the edge containing the link should now have decreased capacity. In this situation, the delta is negative in the amount of single link capacity.

In the case of a "node down" (switch down) event, for every ingress or egress link touching the node, if the link is still usable, it is processed as a link down event as discussed above.

In the case of a "link up" event, the system adds the link to the set P.

And in the case of a "node up" event, for every ingress or egress link touching the node, the process adds the link to the set P. After all events have been processed, the process evaluates the set P. For every link in P, if the link is usable, the process remembers that the edge containing the link should now have increased capacity, with the delta being positive in the amount of single link capacity.

The reason for having the set P is that, for example, a "node up" event does not necessarily mean that the system can use the links touching this node, because the link or its other end switch can be down. With the process described above, the first event that makes the link "usable" adds to the capacity of the edge. Given a list of edges and their delta capacities, the system invokes the edge capacity update process described above (capacities_update_delta). If any allocation has been changed, the process outputs the new allocation map.

The processes and operations described above may be implemented by a processing device such as device 200 of FIG. 2, e.g., a switch or other computing device that is configured to manage network flow control. As discussed above, the device 200 may include one or more processors 202, memory 204 that stores instructions 206 and data 208. The memory can be of any non-transitory type capable of storing information accessible by the processor(s), such as a hard-drive, cache, memory card, ROM, RAM, DVD, CD-ROM, write-capable, and read-only memories.

The instructions 206 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance.

Data 208 can be retrieved, stored or modified by processor 202 in accordance with the instructions 206. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 202 can include any conventional processors, such as a commercially available CPU. Alternatively, the processor can be a dedicated component such as an ASIC or other hardware-based processor. Although FIG. 2 functionally illustrates the processor, memory, and other elements of device 200 as being within the same block, the processor, computer, computing device, or memory can actually comprise multiple processors, computers, computing devices, or memories that may or may not be stored within the same physical housing. For example, the memory can be a hard drive or other storage media located in a housing different from that of switch 200. Accordingly, references to a processor, computer, computing device, or memory will be understood to include references to a collection of processors, computers, computing devices, or memories that may or may not operate in parallel. For example, switch 200 may include one or more server computing devices operating as a load-balanced server farm. Furthermore, although some functions described herein may be indicated as taking place on a single computing device having a single processor, various aspects of the subject matter described can be implemented by a plurality of computing devices, for example, communicating information over a wired or wireless network. And while the operations or processes may be shown or described in a certain order, unless expressly stated herein such operations or processes may be performed in a different order or in parallel.

The foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method of traffic engineering in a computer network having a plurality of fabric blocks in communication with one another, the method comprising:

grouping, by one or more processors, a plurality of middle blocks into a plurality of logical clusters, each of the plurality of logical clusters forming one of the plurality of fabric blocks and including at least two middle blocks;

identifying at least one destination fabric block from among the plurality of fabric blocks;

evaluating, in round-robin order, each destination fabric block of the plurality of fabric blocks;

choosing in round-robin order, by the one or more processors, a single destination middle block $MB_d$ in a selected destination fabric block $FB_d$;

selecting in round-robin order, by the one or more processors, a source fabric block $FB_s$;

identifying, by the one or more processors, a subset M of source middle blocks from among all middle blocks in the source fabric block $FB_s$, the subset of middle blocks being identified as having a shortest available path length to the destination middle block $MB_d$; and selecting for use in a network path, by the one or more processors, one of the source middle blocks $MB_s$ in the subset M that maximizes the following condition:

min(demand($MB_s$, $FB_d$), spf_capacity($MB_s$, $MB_d$)), in which spf_capacity($MB_s$, $MB_d$) represents a shortest path capacity between the source middle block $MB_s$ and the destination middle block $MB_d$, and demand($MB_s$, $FB_d$) represents a demand between the source middle block $MB_s$ and the destination fabric block $FB_d$.

2. The method of claim 1, further comprising generating a route computation graph that facilitates bandwidth allocation through iterative selection of source and destination middle blocks maximizing the condition.

3. The method of claim 1, further comprising, for each source fabric block, splitting demand to a destination fabric block equally among each non-faulty middle block in the destination fabric block.

4. The method of claim 1, further comprising:
scaling out each middle block as a single node;
determining all middle block-level paths for each middle block; and
setting up a tunnel table for each middle block-level path.

5. The method of claim 1, wherein, if not all demand is satisfied, the method further comprises identifying any residue inter-block bandwidth.

6. The method of claim 1, further comprising iteratively performing the method for multiple priority groups.

7. The method of claim 6, further comprising iteratively performing the method for each class of service within each of the multiple priority groups.

8. The method of claim 7, further comprising applying a weighting to each class of service within the multiple priority groups.

9. The method of claim 1, further comprising updating the selection of the source middle block $MB_s$ based on at least one of an up link event and a down link event.

10. A system comprising one or more processors configured to:
group a plurality of middle blocks into a plurality of logical clusters, each of the plurality of logical clusters forming a fabric block including at least two middle blocks;
identify at least one destination fabric block from among the plurality of fabric blocks;
evaluate, in round-robin order, each destination fabric block of the plurality of fabric blocks;
choose, in round-robin order, a single destination middle block $MB_d$ in a selected destination fabric block $FB_d$;
select, in round-robin order, a source fabric block $FB_s$;
identify a subset M of source middle blocks from among all middle blocks in the source fabric block $FB_s$, the subset of middle blocks being identified as having a shortest available path length to the destination middle block $MB_d$; and
select, for use in a network path, one of the source middle blocks $MB_s$ in the subset M that maximizes the following condition:

min(demand($MB_s$, $FB_d$), spf_capacity($MB_s$, $MB_d$)), in which spf_capacity($MB_s$, $MB_d$) represents a shortest path capacity between the source middle block $MB_s$ and the destination middle block $MB_d$, and demand($MB_s$, $FB_d$) represents a demand between the source middle block $MB_s$ and the destination fabric block $FB_d$.

11. The system of claim 10, wherein the one or more processors are further configured to generate a route computation graph that facilitates bandwidth allocation through iterative selection of source and destination middle blocks maximizing the condition.

12. The system of claim 10, wherein the one or more processors are further configured to, for each source fabric block, split demand to a destination fabric block equally among each non-faulty middle block in the destination fabric block.

13. The system of claim 10, wherein the one or more processors are further configured to:
scale out each middle block as a single node;
determine all middle block-level paths for each middle block; and
set up a tunnel table for each middle block-level path.

14. The system of claim 10, wherein, if not all demand is satisfied, the one or more processors are further configured to identify any residue inter-block bandwidth.

15. The system of claim 10, wherein the one or more processors are further configured to iteratively perform, for multiple priority groups, the selection of one of the source middle blocks $MB_s$ in the subset M that maximizes the condition.

16. The system of claim 15, wherein the one or more processors iteratively perform the selection of one of the source middle blocks $MB_s$ in the subset M that maximizes the condition for each class of service within each of the multiple priority groups.

17. The system of claim 16, wherein the one or more processor are further configured to apply a weighting to each class of service within the multiple priority groups.

18. The system of claim 10, further comprising updating the selection of the source middle block $MB_s$ based on at least one of an up link event and a down link event.

19. A non-transitory storage medium storing instructions that, when executed by one or more processors, cause the one or more processors to perform a method of traffic engineering in a computer network having a plurality of fabric blocks in communication with one another, and one or more middle blocks in each fabric block, the method comprising:
grouping a plurality of middle blocks into a plurality of logical clusters, each of the plurality of logical clusters forming one of the plurality of fabric blocks and including at least two middle blocks;
identifying at least one destination fabric block from among the plurality of fabric blocks;
evaluating, in round-robin order, each destination fabric block of the plurality of fabric blocks;
choosing in round-robin order, by the one or more processors, a single destination middle block $MB_d$ in a selected destination fabric block $FB_d$;
selecting in round-robin order, by the one or more processors, a source fabric block $FB_s$;
identifying, by the one or more processors, a subset M of source middle blocks from among all middle blocks in the source fabric block $FB_s$, the subset of middle blocks being identified as having a shortest available path length to the destination middle block $MB_d$; and
selecting for use in a network path, by the one or more processors, one of the source middle blocks $MB_s$ in the subset M that maximizes the following condition:

min(demand($MB_s$, $FB_d$), spf_capacity($MB_s$, $MB_d$)), in which spf_capacity($MB_s$, $MB_d$) represents a shortest path capacity between the source middle block $MB_s$ and the destination middle block $MB_d$, and demand($MB_s$, $FB_d$) represents a demand between the source middle block $MB_s$ and the destination fabric block $FB_d$.

20. The non-transitory storage medium of claim 19, wherein the method further comprises generating a route computation graph that facilitates bandwidth allocation through iterative selection of source and destination middle blocks maximizing the condition.

* * * * *